United States Patent [19]
Elmaleh

[11] Patent Number: 6,113,971
[45] Date of Patent: Sep. 5, 2000

[54] OLIVE OIL BUTTER

[76] Inventor: David R. Elmaleh, 85 E. India Row, Boston, Mass. 02110

[21] Appl. No.: 08/690,051

[22] Filed: Jul. 31, 1996

Related U.S. Application Data

[63] Continuation of application No. 08/279,511, Jul. 25, 1994, abandoned.
[51] Int. Cl.$^7$ ..................................................... A23D 7/005
[52] U.S. Cl. .......................... 426/603; 426/604; 426/606
[58] Field of Search ..................................... 426/603, 601, 426/604, 606

[56] References Cited

FOREIGN PATENT DOCUMENTS

| 1270494 | 6/1990 | Canada . |
| 0500152 A1 | 8/1992 | European Pat. Off. . |
| 0421504 | 5/1995 | European Pat. Off. . |

OTHER PUBLICATIONS

Swern 1979 Baileys Industrial Oil and Fat Products vol. 1, 4th ed. Wiley & Sons New York pp. 368–373.

Gunstone 1983 Lipids in Foods Chemistry, Biochemistry and Technology pp. 147–154.

Gunstjone 1983 Lipids in Foods Chemistry, Biochemistry and Technology Pergamon Press New York pp. 147 and 154.

Hanziker 1920 The Butter Industry La Grange Ill, pp. 530 & 531.

Gunstone 1993 Lipids in Foods Chemistry, Biochemistry and Technology Pergamon Press, New York pp. 152–154.

Anderson 1954 Margarine, Pergamon Press New York pp. 5, 35, 36.

Swern, 1982 Bailey's Industrial Oil & Fat Products, vol. 2 $4^{th}$ Edition Wiley & Sons p. 318.

Swern, 1979, Bailey's Industrial Oil & Fat Products, vol. 1 $4^{th}$ Edition Wiley & Sons p. 240.

Swern 1979 Bailey's Industrial Oil & Fat Products vol. 1, $4^{th}$ ed. John Wiley & Sons, New York pp. 368–371.

*Primary Examiner*—Carolyn Paden
*Attorney, Agent, or Firm*—Paul J. Cook

[57] ABSTRACT

Novel butters and shortenings made from monounsaturated oils such as olive oil are disclosed.

3 Claims, No Drawings

OLIVE OIL BUTTER

This application is a continuation of application Ser. No. 08/279,511 filed on Jul. 25, 1994, Entitled: OLIVE OIL BUTTER now abandoned.

BACKGROUND OF THE INVENTION

Recent medical reports show that dietary intake of olive oil (a fruit oil) in place of butter, margarine and even vegetable oil can result in certain health benefits. For example, olive oil is not only cholesterol-free itself, but in fact has a serum cholesterol lowering effect (especially of low density lipoprotein (LDL), the bad cholesterol). One study shows that inclusion of olive oil in the diet stimulates cholesterol excretion from the small bowel, which may explain the cholesterol lowering effect (Bosaeus, I et al., (February 1992) Eur.J. Clin. Nutr. 46 (2):111–5).

An additional health benefit of olive oil is based on its content of monounsaturated fats (70–80% of total fat). Mono-unsaturated fats have been shown to be less susceptible than poly-unsaturated fats (the main constituent of most vegetable oils) to oxidation (in the body or during storage) and generation of peroxidized, free radical containing, fatty acids, which are immune system suppressants, mutagens, carcinogens, and contribute to aging.

Although olive oil has been consumed for over 2,000 years (originally in the ancient cultures of North Africa, the Middle East, and the European Mediterranean countries), its health benefits have only recently increased its consumption and production in the U.S. and abroad.

Olive oil is obtained by crushing and pressing the olive fruit. Olive oils vary in taste, color (related to chlorophyll content) and odor in accordance with the variety of olive, the growing climate, soil conditions, and maturity when picked. Olive oil retains its original quality upon storage for up to about two years, if kept in a cool and dark environment. Olive oil does not require, but is not damaged by refrigeration. Although refrigeration does result in a thickened oil that appears cloudy.

Olive oil has a wider variety of uses than most other edible oils. Because it has a high flash point, it is frequently used for sautéing and frying. It also functions as a shortening in baking and is a key ingredient in the preparation of many marinades and sauces. Unlike vegetable oils, olive oil has a definite taste and thus lends itself to use as a condiment or seasoning for various vegetables, meats, fish, pastas, and other foods.

Margarines and shortenings are currently prepared from polyunsaturated vegetable oils mainly by hydrogenation. Because vegetable oil margarines and shortenings contain little or no cholesterol, they have been advocated as healthier substitutes to butter and lard. However, recent studies have shown that trans isomers of fatty acids formed during hydrogenation, increase the ratio of plasma low density lipoprotein (LDL) to high density lipoprotein (HDL) in the body, thereby increasing the risk of coronary heart disease (Judd, J. R. et al., (April 1994) Am. J. Clin. Nutr. 59 (4):861–8; Ascherio, A. et al., (January 1994) Circulation 89 (1):94–101; Willett, W. C. et al., (March 1993) Lancet 341 (8845):581–5; and Troisi, R. et al., (December 1992) Am. J. Clin. Nutr. 56 (6):1019–24).

The amount of fat that Americans consume has increased by about 25% over the last 60 years. Fats now provide at least 40% of a person's daily caloric intake (Mead, J., et al., Lipids, (1986 Plenum, New York). A healthier substitute to vegetable oil margarines and shortenings is needed.

SUMMARY OF INVENTION

In one aspect, the invention features novel butters made from monounsaturated oils. Preferred monounsaturated oil butters are made from olive oil (e.g. extra virgin, virgin, pure and light (mild) varieties). In one embodiment, the butter is of a consistency appropriate for formulation into a solid stick at room temperature. In another embodiment, the butter is formulated into a softer consistency than the stick, so that it is easier to spread and can be contained in a tub. A variety of additives (e.g. colors, flavors, aromas, emulsifiers, thickening agents, antispatter agents and antioxidants) can be included in the butters and shortenings to vary the taste, appearance, and smell or to improve the consistency or stability.

In another aspect, the invention relates to novel shortenings made from 95–100% fat, the majority of which is monounsaturated oil, such as olive oil. These novel, healthier shortenings can be used in place of vegetable oil shortenining and lard, for example in baking and deep fat frying.

In a further aspect, the invention relates to preferred methods for making butters and shortenings. In a preferred embodiment, an oil is solidified by controlled water addition across the oil's (monounsaturated or polyunsaturated) double bonds.

The instant disclosed butters and shortenings are a healthier substitute for margarine, vegetable shortenings, dairy butters and lard as a source of a fat in the diet. These new products can be formulated so as to be similar in taste to existing butters, margarines and shortenings or can offer distinct new flavors. In addition, the butter and shortenings can be preserved for a long period of times (up to two years) without loosing essential properties.

Other features and advantages of the invention will become apparent from the following Detailed Description and Claims.

DETAILED DESCRIPTION OF THE INVENTION

The instant invention is based on the finding that healthier butters and shortenings can be made from monounsaturated oils, such as natural olive oil.

"Monounsaturated oil" is an oil (i.e. a liquid composition of fatty acids), in which the majority (at least about 51%) of fatty acids are monounsaturated (i.e. contain only one double bond (e.g. oleic acid (C18:1)). Preferably, for use in the instant invention, the content of monounsaturated fatty acids constituting a monounsaturated oil is at least about 70% of the total fat content, most preferably the monosaturated oil content is greater than 80% (the remainder, if any, being polyunsaturated fatty acids (having at least two double bonds (e.g. linoleic acid (C18:2(n-6)) or saturated fatty acids (having no double bonds (e.g. stearic acid C 18:0)). The monounsaturated oil can be natural or synthetic.

A preferred monounsaturated oil for use in the instant invention is "olive oil", which is a liquid composition (at room temperature) of fatty acids obtained from olives. Olive oil can be obtained, for example, by pressing or squeezing olives. Olive oils have been categorized as "extra virgin", "virgin", "pure" and "light (mild). "Extra virgin" olive oil is typically made from the first pressing of olives, sometimes called cold pressing. It has a fuller-bodied flavor and aroma than the virgin and a darker color than either pure or virgin olive oil. It also has the lowest acidity level (about 0.5%). "Virgin olive oil" is also made from the first pressing. It has an above-average flavor and aroma, but not as distinctive as extra virgin olive oil. Virgin has an acidity level of from about 0.5% up to about 1%. "Pure olive oil" is a blend of virgin and extra virgin oil refined through a process that removes imperfections in flavor and aroma. This leaves the oil with a somewhat bland taste. It is then again blended with extra virgin or virgin olive oils to improve its color and taste. Pure olive oil has an acidity level of up to about 3%. "Light (mild) olive oil" is made by blending different olive oils filtered to a lower viscosity and texture. This creates a subtle, less full-bodied taste. One of the reasons for its popularity is the milder taste, which approximates that of some vegetable oils. Light olive oil has a lower flash point than pure and extra virgin olive oils, and so is frequently used as a replacement for vegetable or corn oil in baking and cooking. "Pomace oil" is produced from the residue remaining after the extra virgin and virgin oils have been extracted. Pomace is high in monounsaturated fatty acids and therefore has all of the health benefits of olive oil. However, because the method used for heat extraction adds a solvent, pomace oil has a harsher taste. Pomace oil is generally only used for cooking.

A monounsaturated oil, such as olive oil can be made into a "monounsaturated oil butter" (i.e. a composition, which is nearly solid at room temperature and has been made from a monounsaturated oil), by any process capable of substituting (adding substituents to) a double bond. One process, which is currently used in preparing polyunsaturated margarines, is controlled hydrogenation (addition of hydrogen atoms). A process for hydrogenating olive oil is further described in the following Example 1. Hydrogenation reactions may require a metal catalyst, which should be removed (e.g. by treatment with water solutions of pectinic acid or other appropriate starch) before the butter is offered for consumption.

Other processes for solidifying monounsaturated oils include hydroxylation (addition of hydroxyl molecules) and hydration (addition of water molecules). Hydration can be facilitated by addition of emusifiers (e.g. lecithin), heating and/or an acid catalyst (which can readily be removed by a water wash and centrifugation). Hydration is a preferred process for making monounsaturated oil butters (or even polyunsaturated oil butters), not only because it results in a more spreadable, consistent product, but also because the reaction can be better controlled, because fewer double bonds are initially effected by the process due to the relatively high molecular weight of water and the hydroxyl group addition.

After a monounsaturated oil has been substituted to some degree, it can be mixed with unsubstituted oil (e.g. a monounsaturated oil) to produce a solid composition therefrom. For example, an appropriate amount (e.g. about 10–50%) of extra virgin or virgin olive oil can be mixed with pure olive oil to produce a less expensive butter having extra virgin's or virgin's taste.

Preferably any substitution process results in a cis rather than a trans fatty acid and is carried out on fatty acids that do not cause excessive graining or become excessively hard upon substitution.

The consistency of the resulting butter can be varied for example by varying the fat content of the butter formulation and/or varying the extent of substituent addition (e.g. hydrogenation, hydroxylation or hydration. Formulations of about 70–90% fat content are useful for making stick butter. Formulations of 20–70% are useful for making tub butters. Formulations approaching 100% fat content, at least 51% or which was originally a monounsaturated oil, are useful as shortenings (e.g. for baking or deep fat frying).

A variety of "additives" can be included in the butter or shortening, for example to vary (improve) the appearance, taste, smell, consitency or shelf life. Examples include color (e.g. beta carotene, anatto, tumeric, paprika and FD & C dyes); flavor or aromas (e.g. lipolyzed butter oils, diacetyl 2-octanone, butyric acid, hexanoic acid, cheese flavoring, herbs and spices (such as paprika, rosemary, basil, oregano, garlic, onion salt, pepper, tumeric)); emulsifiers &/or thickening agents (e.g. phosphatides such as egg yolk, soybean or corn lecithin or starches such as mono- or di- glycerides, gum arabic, tragacanth, arabinogalactan, carrageenan, furcellaran, sodium alginate, bean gum, gum xanthin, guar gum, and apple pectin); antispatter agents (e.g. lecithin); and antioxidants (e.g. vitamins A, C, D, E, B-1, B-5, B-6, zinc, selenium, calcium, alpha tocopherol, glutathione, butylated hydroxytoluene (BHT), butylated hydroxyanisole (BHA), and cysteine).

The instant invention will now be illustrated by the following example, which should not be interpreted as limiting in any way.

EXAMPLE 1

Production of Olive Oil Butter 100 ml. of pure olive oil and 100 mg. of (platinum/carbon) catalyst (Alfort) are hydrogenated under 45 PSI hydrogen in a 500 ml. glass bottle in a Parr hydrogenator apparatus. The olive oil will start to gradually solidify. To allow for homogeneous hydrogenation, the temperature is raised to 40–60° C. After 30–60 min., the liquid butter (60° C.) is washed twice with warm water and the butter is separated from the water by centrifugation. The warm butter is allowed to solidify by cooling to room temperature.

Based on the instant disclosure, one of skill in the art is enabled to make a number of equivalents, which are not specifically taught. Such equivalents are intended to be encompassed by the following claims

I claim:

1. A butter or shortening made by a hydroxylation process comprising the steps of:

a) mixing an appropriate amount of a monounsaturated oil in which at least about 70% of the fat content consists of monounsaturated fatty acids and that is not made from a polyunsaturated or a saturated oil with an appropriate amount of water for an appropriate period of time while heating or in the presence of an acid catalyst to facilitate the addition of water molecules across the double bond, thereby producing a partially hydroxylated fatty acid; and b) cooling the mixture to form a solid.

2. A butter of claim 1, wherein an emulsifier is added in step a.

3. A process of claim 2, wherein the emulsifier is lecithin.

* * * * *